United States Patent [19]

Wakalopulos

[11] Patent Number: 4,694,222
[45] Date of Patent: Sep. 15, 1987

[54] ION PLASMA ELECTRON GUN
[75] Inventor: George Wakalopulos, Pacific Palisades, Calif.
[73] Assignee: RPC Industries, Hayward, Calif.
[21] Appl. No.: 596,093
[22] Filed: Apr. 2, 1984
[51] Int. Cl.$^4$ ............................................. H02K 39/00
[52] U.S. Cl. ........................... 315/111.21; 315/111.91; 315/111.31; 315/111.81
[58] Field of Search ....................... 315/111.21, 111.31, 315/111.81, 111.91, 110; 313/362.1, 363.1, 35, 231.31

[56] References Cited

U.S. PATENT DOCUMENTS

| | | | |
|---|---|---|---|
| 3,243,570 | 3/1966 | Boring | 313/231.31 X |
| 3,411,035 | 11/1968 | Necker et al. | 315/111.81 |
| 3,866,089 | 2/1975 | Hengartner | 315/111.21 |
| 3,903,891 | 9/1975 | Brayshaw | 313/231.31 X |
| 3,970,892 | 7/1976 | Wakalopulos | 315/111.31 |
| 4,061,944 | 12/1977 | Gay | 313/363.1 X |
| 4,359,667 | 11/1982 | Paterson et al. | 313/35 X |

OTHER PUBLICATIONS

Zakharchenko et al., "A Stabilisation Unit for a Cold Cathode Glow Discharge Electron-Beam Gun", Auto. Weld. (GB), vol. 28, No. 12, pp. 56-58, Dec. 1975.
Bayless et al., "The Plasma-Cathode Electron Gun", IEEE Jour. Quantum Electronics, vol. QE-10, No. 2, pp. 213-218, Feb. 1974.

Primary Examiner—David K. Moore
Attorney, Agent, or Firm—Malcolm B. Wittenberg

[57] ABSTRACT

An ion plasma electron gun for the generation of large area electron beams with uniform electron distribution. Positive ions generated by a wire in a plasma discharge chamber are accelerated through an extraction grid into a second chamber containing a high voltage cold cathode. These positive ions bombard a surface of the cathode causing the cathode to emit secondary electrons which form an electron beam. After passing through the extraction grid and the plasma discharge chamber, the electron beam exits from the gun by way of a second grid and a foil window supported on the second grid. The gun is constructed so that the electron beam passing through the foil window has a relatively large area and a uniform electron distribution which is substantially the same as the ion distribution of the ion beam impinging upon the cathode. Control of the generated electron beam is achieved by applying a control voltage between the wire and the grounded housing of the plasma chamber to control the density of positive ions bombarding the cathode.

3 Claims, 10 Drawing Figures

ION PLASMA ELECTRON GUN

BACKGROUND OF THE INVENTION

The ion plasma electron gun of the present invention is of the same general type as the gun disclosed in U.S. Pat. No. 3,970,892. As stated in that patent, a recent advance in the art of generating high energy electron beams for use, for example, in e-beam excited gas lasers, is the plasma cathode electron gun. In such an electron gun a plasma is produced in a hollow cathode discharge between the hollow cathode surface and an anode grid operated at relatively low voltage with respect to the cathode. Electrons are extracted from the discharge plasma through the anode grid and a control grid, and these electrons are accelerated to high energies in a plasma-free region between the grids and an accelerating anode which, typically, is a thin foil window maintained at a relatively high voltage with respect to the cathode. Among the advantages of the plasma cathode electron gun are its structural simplicity and ruggedness, high controlability and efficiency, low cost, and suitability for producing large area electron beams.

A second Patent, namely U.S. Pat. No. 4,025,818 discloses an ion plasma electron gun which is essentially similar to the gun disclosed in U.S. Pat. No. 3,970,892, with the addition of a wire anode for the plasma discharge and a number of baffles which allow the plasma chambers to be connected sequentially.

The electron distribution of the electron beams generated by the tubes of U.S. Pat. Nos. 3,970,892 and 4,025,818 are at the edges of the foil window. An important objective of present invention is to provide an improved structure which generates an electron beam with uniform electron distribution across the entire beam as it emerges from the foil window.

Another object of the invention is to provide such an improved ion plasma electron gun which is constructed for long run time operation and for high efficiency.

DETAILED DESCRIPTION OF THE ILLUSTRATED EMBODIMENT

Figures 1, 3:
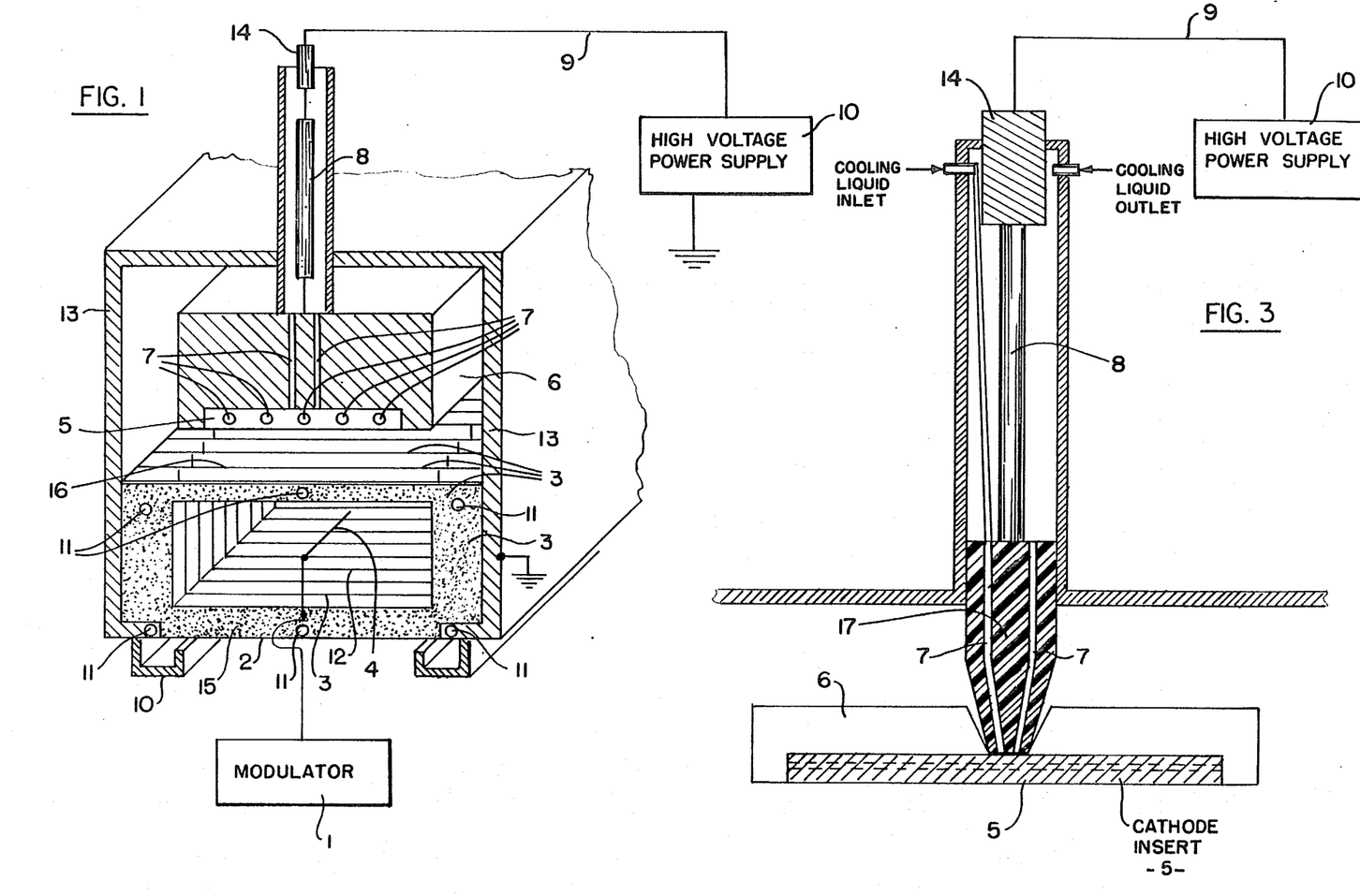
FIG. 1 is a perspective view, partly in section, illustrating the basic components of one embodiment of the ion plasma electron gun of the invention.
FIG. 3 is a more detailed slightly modified sectional veiw of a high voltage feed through assembly which is incorporated into the gun of FIG. 1.

FIG. 1 illustrates the basic components of a plasma electron gun constructed in accordance with one embodiment of the invention. The gun includes an electrically conductive grounded enclosure which is composed of a high voltage chamber 13, an ion plasma discharge chamber 12, and an electron transmissive foil window 2. A wire 4 extends through plasma discharge chamber 12. The foil window is electrically connected to the grounded enclosure, and it forms an anode which causes electrons to be accelerated to and through it. The enclosure is filled to 1–10 millitor Helium. A cathode 6 is positioned in the high voltage chamber 13. An insert 5 for the cathode is mounted on its lower surface. The insert 5 is typically molybdenum, but can be of any material with a high secondary emission coefficient. The high voltage cathode 6 is uniformly spaced from the enclosure to prevent Paschen breakdown.

A high voltage power supply 10 supplies a high negative potential of 200–300 kilo volts to cathode 6 through a cable 9, which extends through an epoxy insulator 14, to a resistor 8 which is interposed between the cable 9 and the cathode 6. The cathode 6 and insert 5 are cooled by an appropriate cooling liquid, such as oil, which is pumped through conduits 7.

The plasma chamber 12 contains a number of metallic ribs 3 which are mechanically and electrically connected together. The ribs 3 contain cut-outs in the center to allow wire 4 to pass through the entire structure. The sides of the ribs 3 facing the cathode 6 form an extraction grid 16, while the opposite sides of the ribs form a support grid 15 for supporting the electron transmissive foil window 2. Liquid cooling channels 11 provide for heat removal from the plasma chamber.

The electron transmissive window 2 may be composed of a 1 mil thick titanium foil, which is supported by the support grid 15 and sealed to the enclosure by an O-ring. A gas manifold 10 is used to cool the foil window with pressurized nitrogen, and to eliminate ozone from the beam area.

Figure 2:
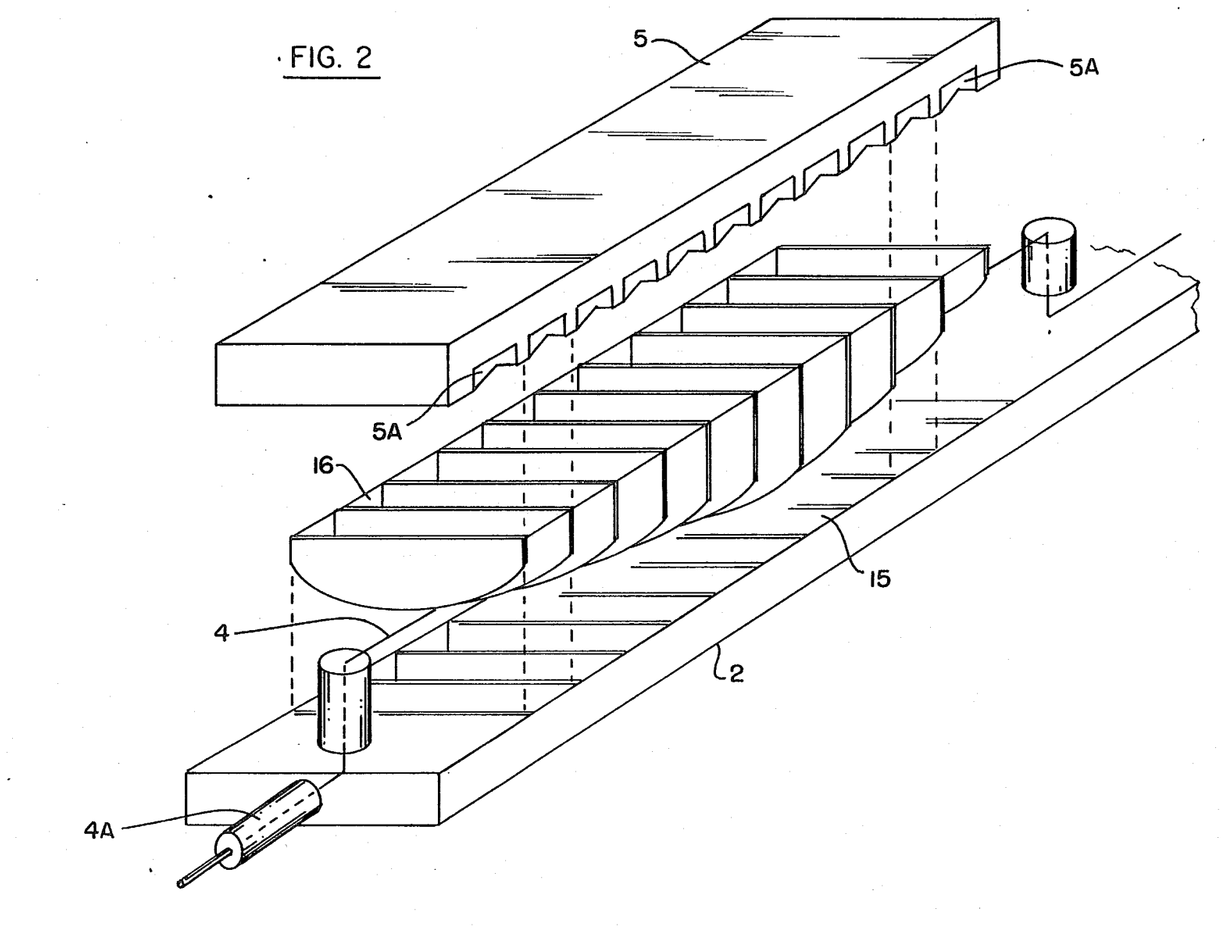
FIG. 2 is a perspective view of certain internal components of the gun of FIG. 1, including a cathode insert, the components having a modified form as compared with the equivalent components in FIG. 1.

A modulator 1 is connected to wire 4 through connector 4A (FIG. 2). When modulator 1 is energized, a positive helium ion discharge is established in the plasma chamber 12 by wire 4. The modulator may be a direct current power supply, or a 20–30 MHz radio frequency generator. Once the ion discharge is established, the electron beam is turned on. The positive helium ions generated in the plasma are attracted to cathode 6 by the field that leaks through the extraction grid 16 into the plasma chamber. This field can vary in strength from a few hundred volts up to 10,000 volts. The ions flow along the field lines through the extraction grid 16 into the high voltage chamber 13. Here they are accelerated across the full potential and bombard the cathode insert 5 as a collimated beam. The secondary electrons emitted by the cathode insert have a slight spatial spread due to the cosine distribution of their emission direction. The resulting electron beam partially impinges on the extraction grid 16 and, therefore, lowers the efficiency of the system.

The efficiency of the system may be increased by the assembly shown in FIG. 2. FIG. 2 shows the cathode insert 5 formed, for example, of copper, or other appropriate electrically conductive material, and containing secondary emitter angled slots 5A whose surfaces are coated, for example, with molybdenum, and which are aligned with the spaces between the ribs of the extraction grid 16. This geometry increases the secondary emission yield and also serves to direct the electrons away from the ribs of extraction grid 16 and hence results in less interception of the electrons by the extraction grid.

In the particular embodiment of FIG. 2, the extraction grid 16 is separated from the foil support grid 15. The electrons from cathode 5 pass into the plasma region and through the foil window to form the electron beam generated by with the ribs of extraction grid 16. The electrons spread slightly after they enter the plasma chamber and have a tendency to impinge on the ribs of the foil support grid. However, by reducing the distance between the grids, this interception can be minimized.

The shape of the extraction grid 16 is crucial to the electron distribution in the electron beam. As shown in FIG. 2, the extraction grid depth is proportional to the field that penetrates the aperture without the grid structure being present. This results in a uniform field penetration and thus yields an electron beam that exhibits a substantially more homogeneous electron beam distribution than that obtained from a flat or uniform extraction grid.

FIG. 3 illustrates in more detail the tubular high voltage feed through assembly of the gun of FIG. 1 which mounts the epoxy insulator 14, resistor 6, and an epoxy vacuum insulator 17 that supports the cathode 5, and which supplies cooling fluid, such as oil, to the cathode insert. A connection extends through the insulator 17 from resistor 8 to the cathode.

Figure 4:
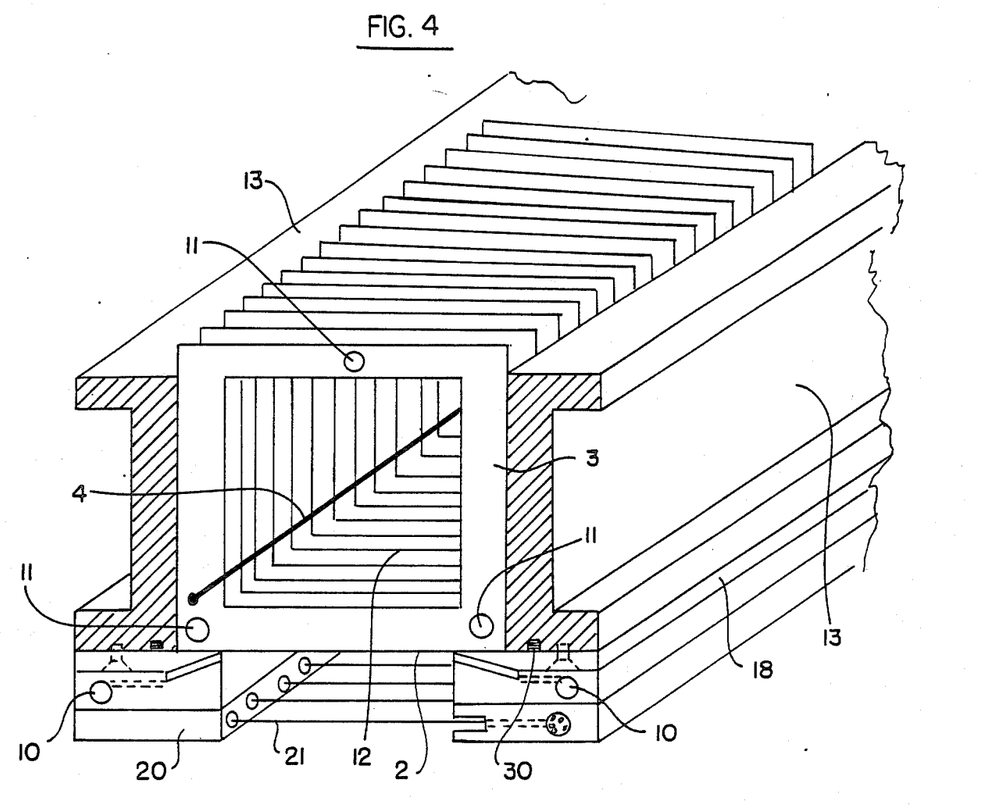
FIG. 4 is a more detailed slightly modified view of the plasma chamber and foil window of the gun of FIG. 1.

A detailed view of the plasma chamber 12 and foil window 2 is shown in FIG. 4. The vacuum housing contains the plasma chamber ribs 3. A support frame 18 seals the foil of window 2 against the vacuum enclosure 13 with an O-ring seal 30. The gas manifold 10 is located above the foil 2 to provide for nitrogen gas cooling for the foil surface. A beam measurement structure is located above the gas manifold, and it includes wires 21 which intercept the electron beam and register a voltage or resistance which is measured and converted into current density. This allows for real time monitoring of the electron distribution within the beam.

Figure 5:
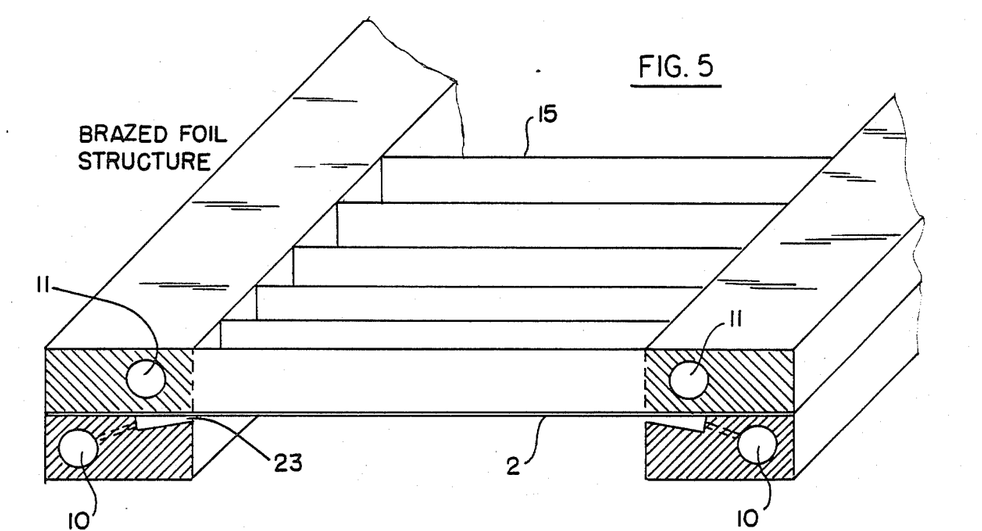
FIG. 5 is a fragmentary perspective view of the foil window of FIG. 4 and its supporting ribs.

Details of the foil window assembly are illustrated in FIG. 5. The assembly includes a foil 2 brazed to the ribs of the foil support grid 15 so as to decrease thermal contact resistance. The assembly includes the gas manifold 10, which emits gas through slot 23 against the foil, for cooling purposes and which serves to increase the electron transmissive efficiency of the foil.

Figure 6:
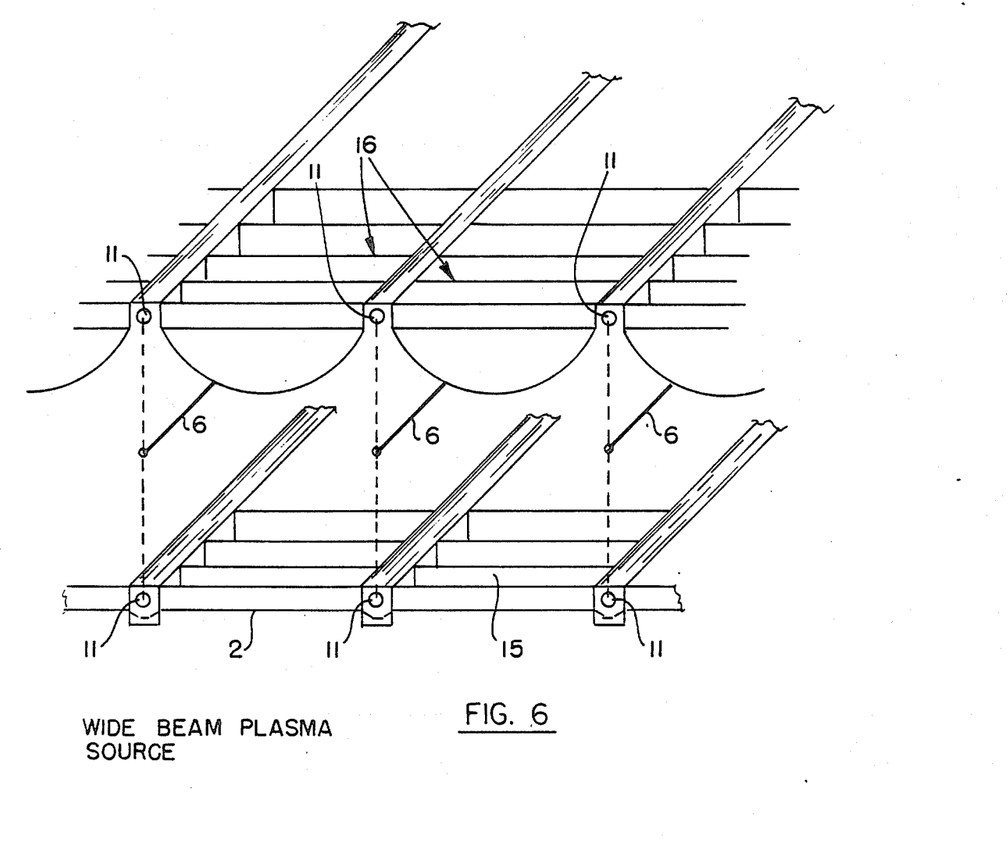
FIG. 6 is a perspective view of a modified gun structure in which the area of the plasma source is increased to increase the width of the electron beam generated by the electron gun.

In the embodiment shown in FIG. 6, the area of the plasma source is increased so as to increase the width of the generated electron beam. A number of wires 6 are located between the ribs of extraction grid 16 which replace the single wire 4 of the previous embodiment, and which serve to improve the homogenity of the electron beam. The ribs of the foil support grid 15 and the ribs of the extraction grid 16, as in the previous embodiment, are aligned, as well as the cooling channels 11.

Figure 7:
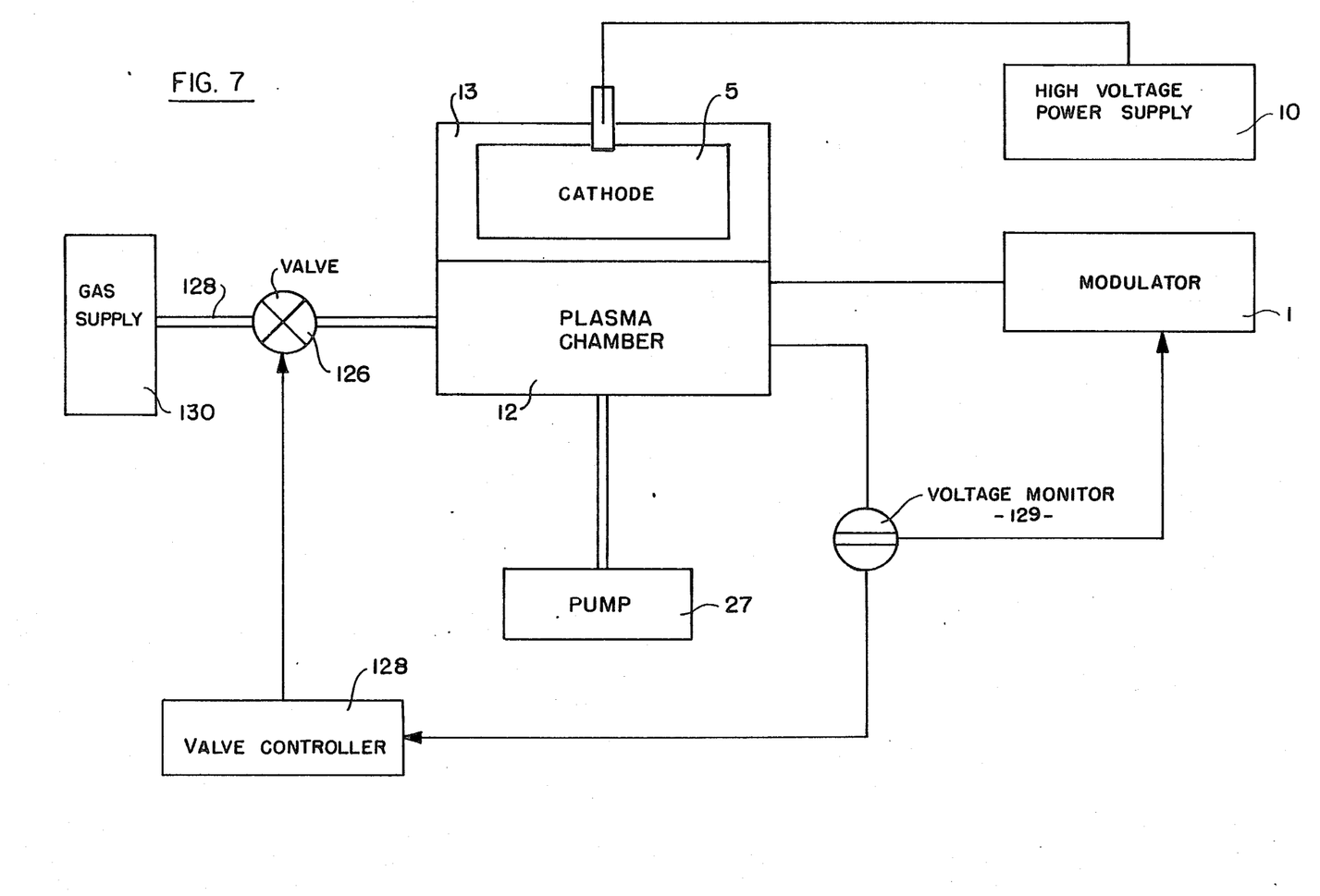
FIG. 7 is a block diagram of a pressure and current stabilization system for the gun of FIG. 1.

For a long run time operation, some means is required to monitor the actual pressure in the vacuum enclosure of the gun. A change in vacuum pressure affects the plasma density and hence the electron current density. FIG. 7 illustrates an appropriate system for stabilizing pressure and electric current in the gun. The initial pressure within the enclosure is set by adjusting a valve 126 in a line 128 extending from a pressurized gas supply source 130 into the plasma chamber 12. The plasma is initiated by turning on modulator 1. Voltage monitor 129 measures the instantaneous quiescent pressure and any impurities that might evolve from the vacuum vessel. A rise in voltage indicates a lower pressure. The output of voltage monitor 129 is used to control valve 126 through a valve controller 127 thereby to control the vacuum pressure within the gun. The current from modulator 1 is also controlled by the voltage monitor 129, as shown. The system shown in FIG. 7 assures a stable output electron beam current.

Figure 8:
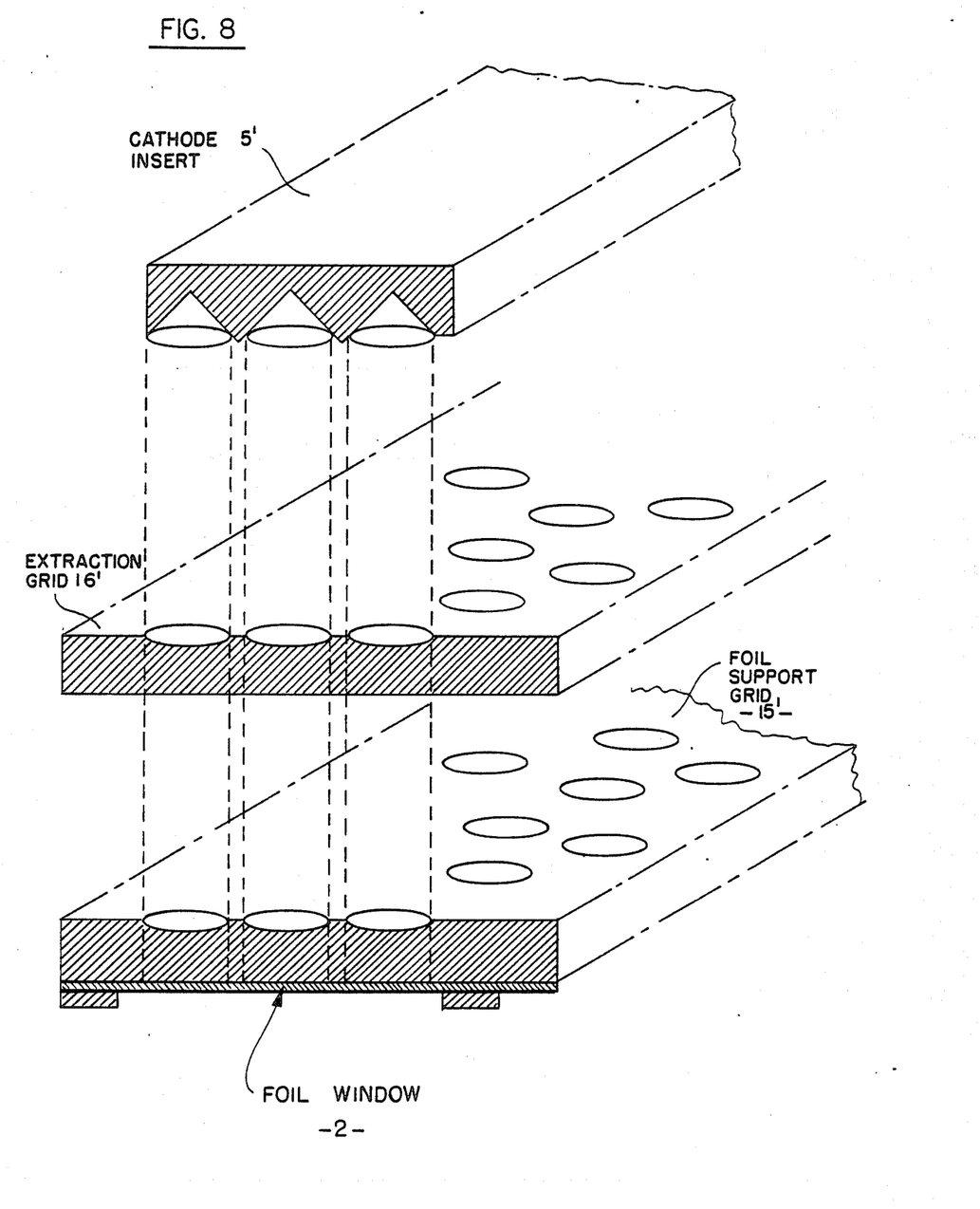
FIG. 8 is a perspective view of a modified grid structure for the gun.

In the embodiment of FIG. 8, cathode insert 5' has a plurality of conical-shaped depressions extending over its surface, lined with molybdenum or other secondary emissive material. The extraction grid 16' has a multiplicity of holes therein in axial alignment with the conical-shaped depressions, and the foil support grid 15' has a plurality of holes in it axially aligned with the holes in the extraction grid 16'.

Figure 9:
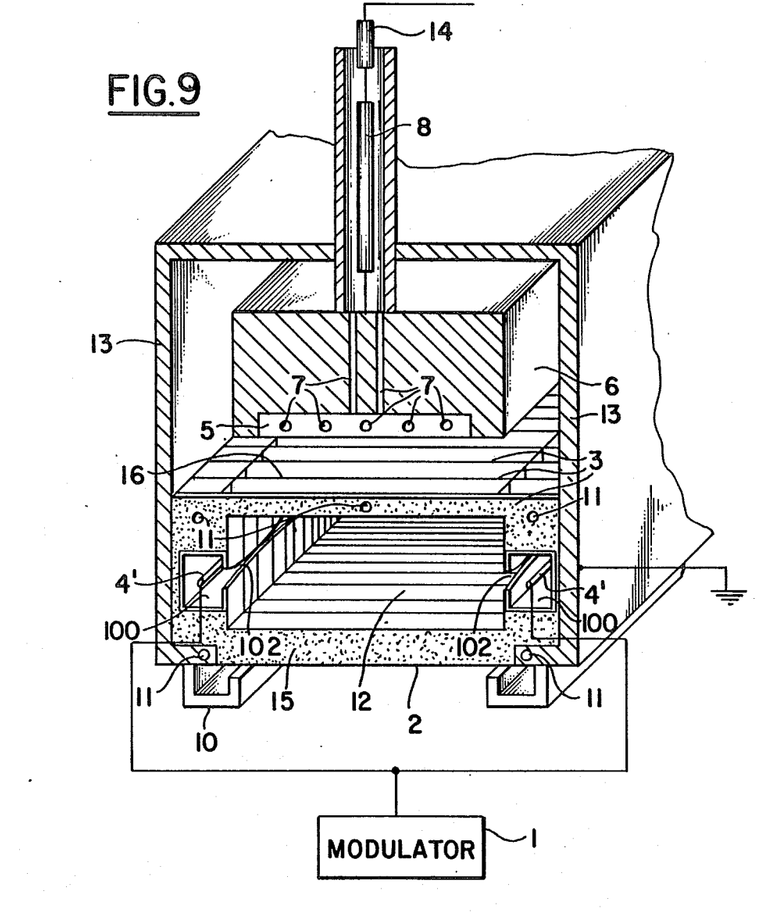
FIG. 9 is a view, like FIG. 1, of a slightly modified version of the gun.
Figure 10:
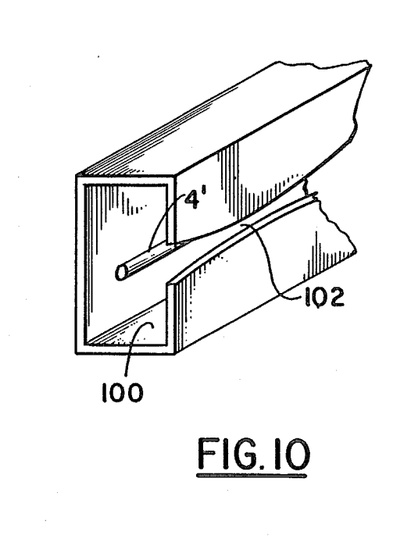
FIG. 10 is a fragmentary perspective view of a portion of the embodiment of FIG. 9.

The embodiment of FIG. 9 is generally similiar to FIG. 1, except that the wire ion source 4 is replaced by a pair of plasma wires 4' which are located in chambers 100 displaced from the path of the electron beam. The ions are drawn to cathode 6 through slots 102 in the sides of the chambers, the slots being shaped to provide a uniform field in the plasma chamber.

This embodiment operates with high efficiency because the secondary electrons emitted by the cathode all have free and unimpeded paths to the foil window 2.

It will be appreciated that although particular embodiments of the invention have been shown and described, modifications may be made. It is intended in the claims to cover all modifications which come within the true spirit and scope of the invention.

What is claimed is:

1. An ion plasma electron gun assembly comprising: an electrically conductive evacuated housing forming first and second chambers adjacent to one another and having an opening therebetween; means for generating positive ions in said first chamber; a cathode positioned in said second chamber in spaced and insulated relationship from said housing, said cathode having a secondary electron emissive surface; means for applying a high negative voltage between said cathode and said housing to cause said cathode to draw the positive ions from said first chamber to said second chamber to impinge on said surface of said cathode and to cause said surface to emit secondary electrons; an electrically conductive electron transmissive foil extending over an opening in said housing at the end of said first chamber facing said cathode, said foil being electrically connected to the housing to constitute an anode for the secondary electrons and causing the secondary electrons to pass through the foil as an electron beam; an electrically conductive extractor grid mounted in said second chamber adjacent to the secondary electron emissive surface of said cathode and connected to said housing to create an electrostatic field at said surface to cause secondary electrons therefrom to pass through the openings in the grid and into said first chamber; and an electrically conductive support grid mounted in said first chamber adjacent to said foil and connected to said foil and to said housing, said support grid serving to support said foil and having openings therein aligned with the openings in said extractor grid to act in conjunction with said extractor grid to accelerate the secondary electrons to the foil,
  wherein said secondary electron emissive surface of said cathode has grooves formed therein at predetermined angles to increase electron emission and to direct electrons through the openings in said extraction grid.

2. An ion plasma electron gun assembly comprising: an electrically conductive evacuated housing forming first and second chambers adjacent to one another and having an opening therebetween; means for generating positive ions in said first chamber; a cathode positioned in said second chamber in spaced and insulated relationship from said housing, said cathode having a secondary electron emissive surface; means for applying a high negative voltage between said cathode and said housing to cause said cathode to draw the positive ions from said first chamber to said second chamber to impinge on said surface of said cathode and to cause said surface to emit secondary electrons; an electrically conductive electron transmissive foil extending over an opening in said housing at the end of said first chamber facing said cathode, said foil being electrically connected to the housing to constitute an anode for the secondary electrons and causing the secondary electrons to pass through the foil as an electron beam; an electrically conductive extractor grid mounted in said second chamber adjacent to the secondary electron emissive surface of said cathode and connected to said housing to create an electrostatic field at said surface to cause secondary electrons therefrom to pass through the openings in the grid and into said first chamber; and an electrically conductive support grid mounted in said first chamber adjacent to said foil and connected to said foil and to said housing, said support grid serving to support said foil and having openings therein aligned with the openings in said extractor grid to act in conjunction with said extractor grid to accelerate the secondary electrons to the foil,
  wherein said extractor grid and support grid each comprise a flat planar member, and have a plurality of aligned holes therein, and in which said secondary emissive surface of said cathode has a plurality of conical-shaped depressions therein aligned with said holes.

3. An ion plasma electron gun assembly comprising: an electrically conductive evacuated housing forming first and second chambers adjacent to one another and having an opening therebetween; means for generating positive ions in said first chamber; a cathode positioned in said second chamber in spaced and insulated relationship from said housing, said cathode having a secondary electron emissive surface; means for applying a high negative voltage between said cathode and said housing to cause said cathode to draw the positive ions from said first chamber to said second chamber to impinge on said surface of said cathode and to cause said surface to emit secondary electrons; an electrically conductive electron transmissive foil extending over an opening in said housing at the end of said first chamber facing said cathode, said foil being electrically connected to the housing to constitute an anode for the secondary electrons and causing the secondary electrons to pass through the foil as an electron beam; an electrically conductive extractor grid mounted in said second chamber adjacent to the secondary electron emissive surface of said cathode and connected to said housing to create an electrostatic field at said surface to cause secondary electrons therefrom to pass through the openings in the grid and into said first chamber; and an electrically conductive support grid mounted in said first chamber adjacent to said foil and connected to said foil and to said housing, said support grid serving to support said foil and having openings therein aligned with the openings in said extractor grid to act in conjunction with said extractor grid to accelerate the secondary electrons to the foil,
  wherein said electron gun further includes a plurality of wires supported under the foil window to monitor the electron beam uniformity by the measurement of individual resistances of the wires.

* * * * *